Sept. 8, 1959  W. G. DE GRAY  2,903,223
HAND RAIL MOUNTING BRACKET
Filed April 5, 1956
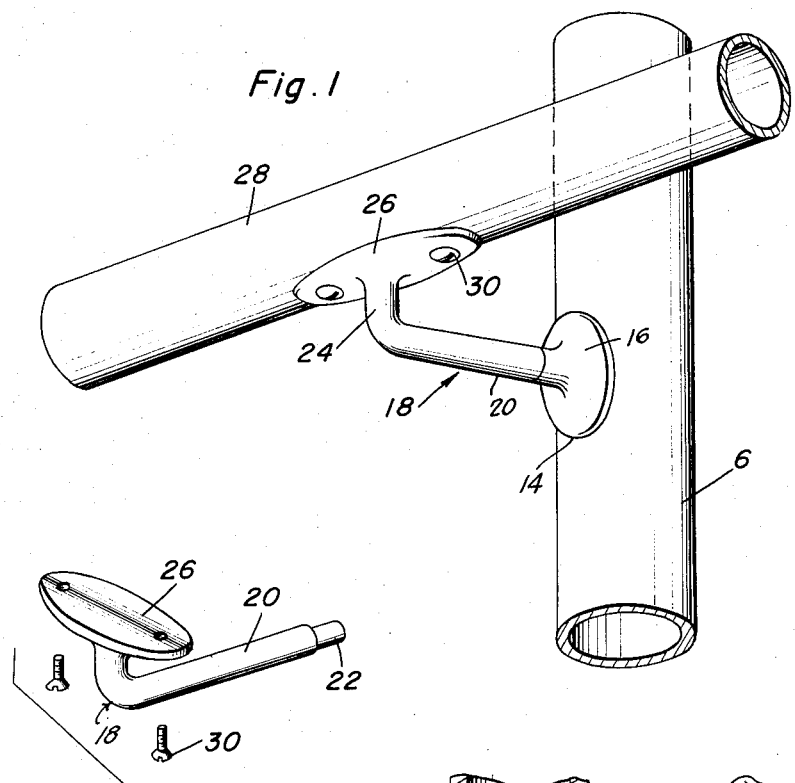
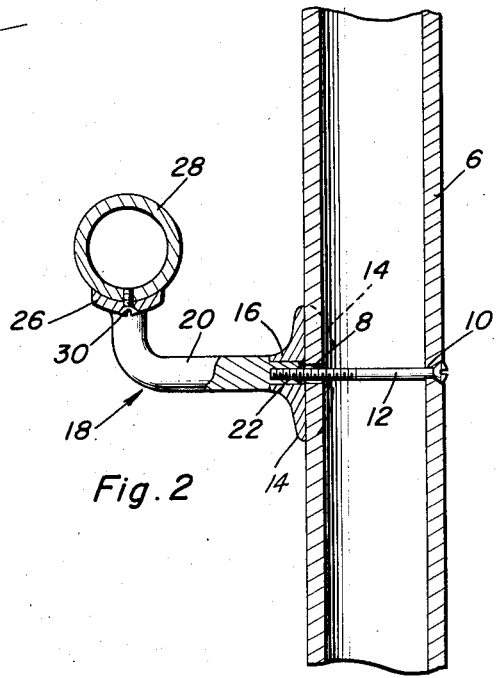
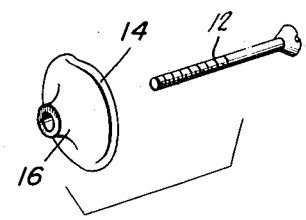
William Grant De Gray
INVENTOR.

United States Patent Office 2,903,223
Patented Sept. 8, 1959

2,903,223

HAND RAIL MOUNTING BRACKET

William Grant De Gray, West Palm Beach, Fla., assignor of fifty percent to Hazel Verdes, West Palm Beach, Fla.

Application April 5, 1956, Serial No. 576,381

2 Claims. (Cl. 248—221)

The present invention relates to a special purpose bracket which is expressly designed and functions satisfactorily to connect tubular parts, for example two lengths of pipes together in predetermined relationship wherein one pipe serves, for example as an upright or post and the other as a hand rail or balustrade.

Structures of the above class are used for many and varied purposes and in order to simplify the instant presentation it will clarify matters to assume that in the arrangement depicted in the drawings one pipe is a post and the other a hand rail, the bracket serving to connect the two together as would be the situation on either one or both sides of a stairway or in any equivalent structural and building adaptation. The object of the invention has to do with the construction and manner in which the bracket cooperates with the post and hand rail.

It is a further object of the invention to provide a simple, practical and expedient hand rail attaching or mounting bracket of an adjustable type which is such in construction that it will comply with ordinary requirements and economies of manufacturers and will comply with transporting and erecting requirements of builders and contractors but, what is more important, lends itself to expedient use by unskilled hands.

In carrying out the principles of the invention a substantially L-shaped bracket is provided wherein the short arm, adapted for vertical disposition, is provided with a cradle for seating and supporting a cooperating portion of the hand rail. The other arm is adjustably mounted in a socket member forming a part of the saddle, the saddle being bolted to the post or other upright member.

Other objects, features and advantages will become more readily apparent from the following description and the accompanying sheet of illustrative drawings.

In the drawings wherein like numerals are employed to designate like parts throughout the views:

Figure 1 is a perspective view of the improved bracket showing its construction and the manner in which it is used;

Figure 2 is a view of the same with the parts appearing primarily in section;

Figure 3 is a perspective view of the bracket proper; and

Figure 4 is a perspective view of the adapter saddle and bolt.

Referring now to the drawings the numeral 6 designates one pipe or tube member which is here to be treated as a stairway or equivalent post. As shown in Figure 2 bolt holes 8 and 10 to accommodate the headed bolt 12 are drilled therein in required diametrically opposite alignment. The adapter plate or saddle is denoted by the numeral 14 and has a centrally apertured protruding hub portion 16 which constitutes a socket member. The disk-like body or base portion is shaped so that it conformingly fits the convex or part cylindrical surface of the post in the manner shown perhaps best in Figs. 1 and 2. It is obvious that the socket member or hub is lined up with the bolt hole 8. As before stated the bracket proper is denoted by the numeral 18 and it is generally L-shaped and comprises what may be designated as a long arm 20 having a reduced terminal end 22 which is axially socketed and screw threaded to accommodate the threaded shank of the aforementioned bolt 12 in the manner shown in Fig. 2. This socketed reduced end or shank 22 also serves as a fitting in that it is removably and telescopically as well as rotatably mounted in the socket member 16. This allows it to be swiveled or angled to properly position the ovate head or cradle, which is carried by the short arm 24 in the desired seating and supporting position shown. The cradle is denoted by the numeral 26 and it is fashioned to properly conform and seat the second pipe member which is here designated as a hand rail 28. The hand rail is provided with holes which are threaded to accommodate the screws or equivalent fastenings 30. Thus the bracket is detachably and adjustably mounted on the adapter plate and the adapter plate is bolted to the post by the bolt 12 which also serves to bind and "lock" the bracket in its set or adjusted position. It is usually desirable to fasten the bracket 18 on the pipe or hand rail and to then slip the trunnion-like shank 22 into the socket member 16, make the adjustment and then tighten up the assembling and retaining bolt 12 which have been previously arranged in readiness for the hookup.

Being quite simple in construction and mode of use and functioning it is believed that an extensive specification is perhaps unnecessary.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use in detachably and adjustably mounting a tubular stair climbing hand rail to a post which is used to support the hand rail, a post and hand rail mounting bracket comprising an L-shaped member embodying long and short limbs, said short limb having an upwardly disposable end portion provided with a head, said head being fashioned into a cradle-like seat, said seat being adapted to seat and fasten a hand rail thereto, said long shank being provided with an axial trunnion-like shank and said shank being provided with an axial screw threaded socket, an adapter by way of which the bracket is detachably and swivelly mounted on the stated post, said adapter comprising a concavo-convex plate having its concave side fashioned to fit against an exterior surface of the post and provided on its convex side at its center with an outstanding nipple-like smooth bored socket member, and a bolt having a screw threaded shank which is adapted to pass axially through a central opening provided therefor in the adapter plate in a manner to be screwed into said screw threaded socket.

2. A bracket for mounting a safety-type hand rail on a stairway comprising an adapter characterized by a concavo-convex plate having its concave side adapted to conformingly fit against an exterior surface of a post and having a central bolt hole and an outstanding axially bored nipple-like socket member projecting beyond its convex side, and a bracket having an arm terminating in a reduced trunnion-like shank provided with an axial screw threaded socket, said shank fitted removably and swivelly into said socket member, and a bolt adapted to pass through bolt holes in said post and having a threaded shank engaged with said axial socket, said bracket being L-shaped and having a long arm which is provided with said trunnion-like shank, and a short arm provided with a head, said head being fashioned into a cradle-like seat for a hand rail.

References Cited in the file of this patent

UNITED STATES PATENTS

| | | |
|---|---|---|
| 302,773 | Peters | July 29, 1884 |
| 1,793,191 | Plimpton | Feb. 17, 1931 |
| 1,816,694 | Pope | July 28, 1931 |
| 2,022,386 | Pittman | Nov. 26, 1935 |
| 2,288,844 | Schilling | July 7, 1942 |
| 2,529,173 | Moyer et al. | Nov. 7, 1950 |
| 2,746,353 | Wells | May 22, 1956 |